United States Patent [19]
Mozes

[11] 3,809,078
[45] May 7, 1974

[54] DETECTOR DEVICE FOR DETECTING UNINTENTIONAL URINATION

[76] Inventor: Alexander Mozes, 301 Lesmill Rd., Don Mills 405, Ontario, Canada

[22] Filed: July 20, 1972

[21] Appl. No.: 273,443

[52] U.S. Cl............................................ 128/138 A
[51] Int. Cl...................... A61b 19/00, A41b 13/02
[58] Field of Search......... 128/2, 2.1, 138, 294, 295

[56] References Cited
UNITED STATES PATENTS
| | | | |
|---|---|---|---|
| 2,874,695 | 2/1959 | Vaniman | 128/138 A |
| 3,460,123 | 8/1969 | Bass | 128/138 A |
| 3,530,855 | 9/1970 | Balding | 128/138 A |

FOREIGN PATENTS OR APPLICATIONS
| | | | |
|---|---|---|---|
| 278,769 | 10/1951 | Switzerland | 128/138 A |

Primary Examiner—Charles F. Rosenbaum
Attorney, Agent, or Firm—Fetherstonhaugh & Co.

[57] ABSTRACT

Devices for detecting unintentional urination are well known. However, they have generally employed complex detector electrode means. The detector electrode means of the present invention is extremely simple, employing a narrow strip of plastic material with electrodes woven through the body of the strip and extending outwardly from the strip in spaced relationship over a predetermined length of the strip spaced inwardly from the end of the strip. The electrodes are covered by a water pervious cover. The cover serves to act as a barrier between the metal electrodes and the wearer. The cover may be in the form of a disposable paper sleeve.

9 Claims, 5 Drawing Figures

PATENTED MAY 7 1974     3,809,078
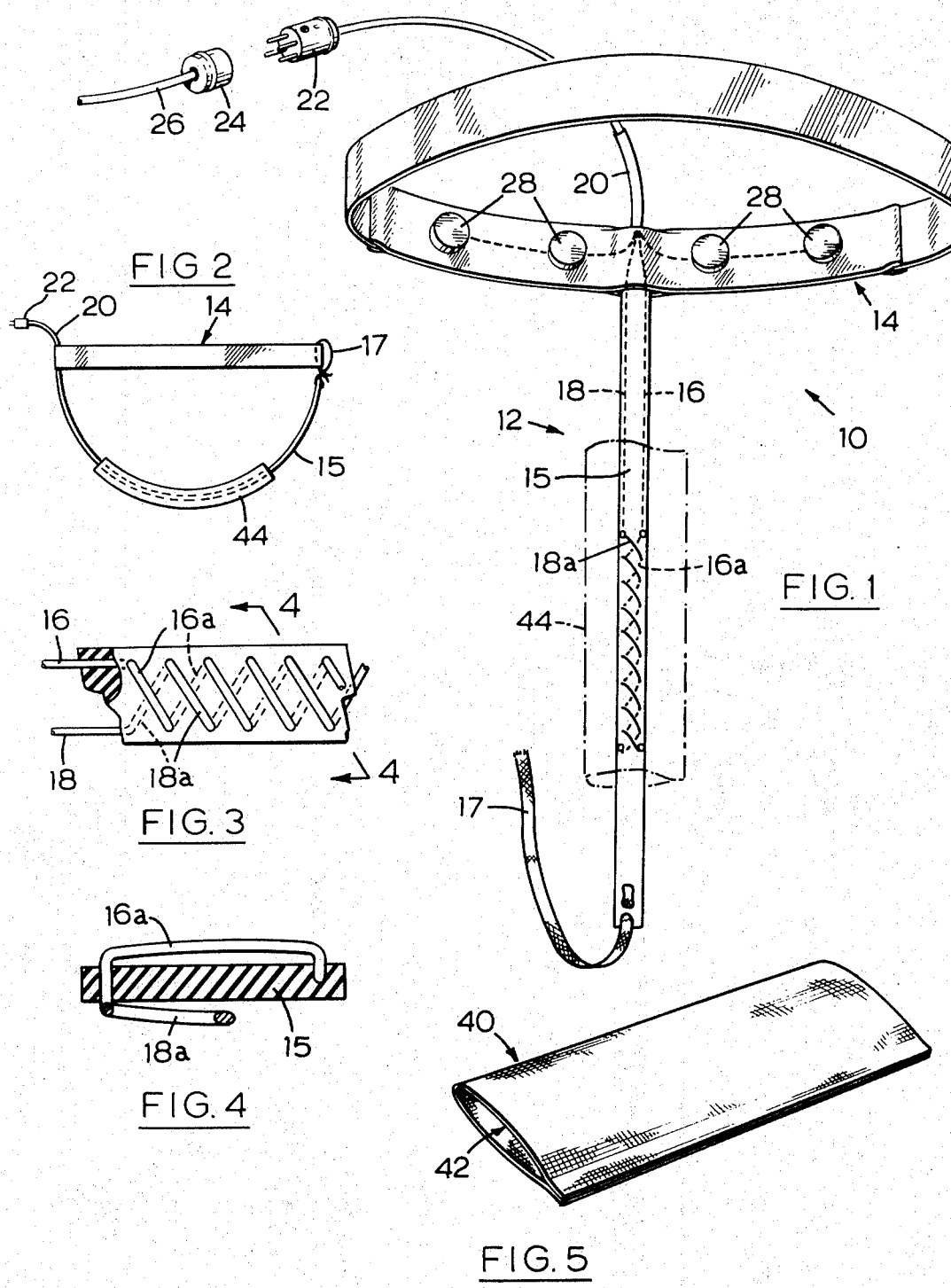

DETECTOR DEVICE FOR DETECTING UNINTENTIONAL URINATION

This invention relates to devices for detecting unintentional urination. In particular, this invention relates to an improved detector for use in a device for detecting and signalling unintentional urination.

Numerous devices have previously been designed for use in detecting and signalling unintentional urination. In these prior devices the detector means has been expensive to manufacture and frequently uncomfortable to the wearer. In the expensive devices, electrodes are buried in a permanent reusable cover which, when wet, serves to complete the circuit of the electrodes. The problem with this type of device is that it is difficult to ensure that it is hygenically cleaned for reuse. In other known constructions the electrodes are simply enclosed in a disposable cover without the use of the support for the electrodes. This structure has the disadvantage that the cover and the electrodes are not sufficiently resilient to retain their form with the result that they can be uncomfortable to the wearer and they can also be deformed to a position wherein they are not suitably located to be immediately exposed to unintentional urination.

The present invention overcomes the difficulties of prior art described above and provides a simple and inexpensive detector device for use in a device for detecting and signalling unintentional urination.

According to an embodiment of the present invention there is provided an improvement in a device for detecting and signalling unintentional urination which comprises detector means in the form of a narrow strip of flexible plastic material having an inner face and an outer face and a pair of electrodes mounted on the inner face in a spaced relationship and exposed thereon such that in use, the release of urine will bridge the electrodes to complete the detector circuit of the electrodes.

According to a further embodiment of this invention the narrow flexible plastic material has a width in the range of 0.25 to 1.5 inches.

According to a still further embodiment of the present invention the detector means is connected at one end to a waist band and it is adapted to be connected at the other end to the waist band at a position spaced from the point at which the first end is connected so that a portion of the detector strip can be located in the area of the urine outlet of the patient as required.

The invention will be more fully understood after reference to the following detailed specification read in conjunction with drawings wherein:

FIG. 1 is a pictorial view of a device for detecting unintentional urination according to an embodiment of the present invention;

FIG. 2 is a side view of the device of FIG. 1 arranged in an operational configuration;

FIG. 3 is a partially sectioned view of a portion of the detector according to an embodiment of the present invention;

FIG. 4 is a sectional view taken along the line 4—4 of FIG. 3;

FIG. 5 is a pictorial view of a cover for use with the detector of the present invention.

Referring to FIG. 1 of the drawings, the reference numeral 10 refers generally to a device for detecting unintentional urination according to an embodiment of the present invention in which the principal elements are the detector 12 and the waistband 14. The detector device 12 comes in the form of a narrow strip of resiliently flexible plastic material 15, preferably having a width in the range of 1.5 to 0.25 inches and thickness measuring about 0.125 inches. The strip 15 is preferably made from plastic material such as polyethylene, polypropylene, polytetrafluoroethylene, nylon, or the like. The strip 15 is connected at one end to the waistband 14 as shown in FIG. 1 and it has a tie cord 17 extending from the other end thereof.

With reference to FIGS. 1, 3 and 4, it will be seen that the pair of electrodes 16 and 18 are enclosed within the body of the plastic strip over a major portion of the length of the strip extending inwardly from the end of the strip which is connected to the waistband 14. The electrodes emerge from the body of the strip over a portion of the strip which is spaced a substantial distance from the waistband so as to form a plurality of exposed electrodes 16a and 18a which are woven to and fro through the body of the strip 15 to be exposed on opposite sides of the strip. The strip 15 serves to insulate one electrode from the other.

As shown in FIG. 1 of the drawings, the strip 15 is connected at one end to the waistband 14 and the electrodes 16, 18 are connected within the waistband to an article cable 20 which has a connector 22 at the free end thereof adapted to be connected with the connector 24 which may be connected to a signalling device and/or a source of electric power (not shown).

The waistband 14 is preferably formed from an elastic material so that it may fit comfortably around the waist of the patient. A number of stimulator electrodes 28 are mounted on the inner surface of the waistband 14 and electrically connected to the source of electrical power by means of the cable 20.

In FIG. 5 of the drawings a disposable cover is generally identified by the reference numeral 40. The cover is preferably made from an inexpensive moisture absorbent paper folded upon itself and sealed along one edge so as to form a sleeve having a passageway 42 formed therein. The passageway 42 is of sufficient width to receive the detector strip 12 and it has a sufficient length to extend over the full length of the exposed portion of the electrodes 16a and 18a so as to form a barrier between the exposed electrodes 16a and 18a and the wearer. The cover 40 when dry will not complete the circuit by bridging the gap between exposed electrodes 16a and 18a. However, when moist or wet, the cover will bridge the gap between the electrodes 16a and 18a and thereby complete the circuit of electrodes.

When the device of the present invention is to be used, the waistband 14 is fitted around the waist of the patient, and a disposable cover 40 is positioned (shown in broken lines) at 44 in FIG. 1 so that it envelopes the portion of the detector strip wherein the electrodes are exposed. The strip is then passed between the legs of the patient and secured by means of the tie 17 to the waistband so as to assume the configuration shown in FIG. 2 of the drawings. When in this position, the absorbent cover and the underlying exposed portions of the electrodes 16a and 18a are positioned in the area of the urine outlet of the patient. If the patient urinates, the cover 40 will absorb the urine and when moist or wet, the cover will electrically bridge the gap between the exposed electrode portions 16a and 18a so as to complete the circuit of the detector. When the circuit is completed, the signal will be directed from the detector to the stimulator electrodes 28 which will then provide a stimulating electrical impulse to the patient sufficient to arouse the patient. Having been aroused, the patient may then disconnect the connectors 22 and 24 so that to disconnect the stimulator electrodes from their source of power. The tie 17 may then be undone and the wet cover may be removed. The electrodes may then be cleaned and dried and a fresh cover inserted over the exposed portions of the electrodes as previously described and then the device may be reused. A detector device can be very easily cleaned by hospital laundries or it may be steam cleaned. The fact that the strip is made from a plastic material overcomes the difficulties involved with woven fibrous materials of the prior art, in that they require very careful cleaning and drying.

A perforated plastic cover may be substituted for the disposable cover, and the plastic cover may be permanently secured relative to the electrodes. The important feature in this construction is that the cover permits free flow of the urine to the electrodes while preventing the electrodes from coming in direct contact with the body of the wearer.

It will also be apparent that the detector device 12 of the present invention may be used with any of the known types of supports signalling devices and stimulators. An alternative type of waistband and stimulator is described in my co-pending application Ser. No. 75,802 filed Feb. 25, 1970.

From the foregoing it will be apparent that the device of the present invention provides a simple and inexpensive device for detecting and signalling unintentional urination.

The embodiments of the invention in which an exclusive property or privelege is claimed are defined as follows:

1. In a device for detecting and signalling unintentional urination, the improvement of detector means suitable for use within a water pervious cover, a detector means comprising a narrow strip of a flexible, electrically insulating, plastic material having an inner face and an outer face and a pair of metal electrodes mounted on and exposed at said inner face in a spaced relationship and exposed thereon such that in use the unintentional release of urine will complete the detector circuit of the electrodes.

2. In a device for detecting and signalling unintentional urination, the improvement of a detector means and a disposable cover for said detector means, said detector means comprising a narrow strip of a flexible, electrically insulating, plastic material having an inner face and an outer face and a pair of metal electrodes mounted on and exposed at said inner face in a spaced relationship and exposed thereon, said cover means consisting of a disposable sleeve of moisture absorbent material having a passage therein adapted to receive said strip such that said sleeve forms a barrier between the electrodes and the wearer which when wet serves to complete the detector circuit of the electrodes.

3. In a device for detecting and signalling unintentional urination, the improvement of the waistband adapted to be worn by a patient and a detector means consisting of a narrow strip of a flexible, electrically insulating, plastic material having an inner face and an outer face, one end of said strip being permanently secured to said waistband and the other end of said strip being adapted to be secured to said waistband in a spaced relationship with respect to said one end whereby a portion of said strip may be located in the vicinity of the urine outlet of a patient in use, a pair of wire electrodes mounted on and exposed at the inner face of said strip in a spaced relationship in said portion of said strip which is to be located in the vicinity of the urine outlet of the wearer, said electrodes being embedded in and electrically insulated by said strip between said one end thereof and said exposed portion, and a disposable sleeve of moisture absorbent material having a passage therein receiving said strip such that said sleeve forms a barrier between said electrodes and said patient which when moistened by unintentional urination will complete the detector circuit of the electrodes and means for connecting said detector to a source of electrical power and a signalling device as required in use.

4. A device as claimed in claim 1, wherein said metal electrodes are made from wire which is woven to and fro through the thickness of said strip so as to be exposed on said inner and outer faces.

5. A device as claimed in claim 1, wherein said strip has a width in the range of .25 inches to 1.5 inches.

6. A device as claimed in claim 1, wherein said plastic strip is made from a material selected from the group of materials consisting of polyethylene, nylon, polytetrafluoroethylene.

7. A device as claimed in claim 2 wherein said cover is made from a moisture absorbing paper.

8. A device as claimed in claim 2 wherein said metal electrodes are made from wire which is woven to and fro through the thickness of said strip so as to be exposed on said inner and outer faces.

9. A device as claimed in claim 3 wherein said metal electrodes are made from wire which is woven to and fro through the thickness of said strip so as to be exposed on said inner and outer faces.

* * * * *